United States Patent [19]

du Moulin

[11] Patent Number: 4,912,917
[45] Date of Patent: Apr. 3, 1990

[54] MULCHER

[76] Inventor: Edward du Moulin, 16 Frazer Street, Collaroy, New South Wales, 2097, Australia

[21] Appl. No.: 47,372

[22] Filed: May 6, 1987

[30] Foreign Application Priority Data

May 9, 1986 [AU] Australia .............................. RH5816
Dec. 10, 1986 [AU] Australia .............................. RH9424

[51] Int. Cl.$^4$ .......................................... A01D 34/63
[52] U.S. Cl. .................... 56/16.9; 241/101.1
[58] Field of Search .................. 56/16.9, 17.5, 60; 241/101.1

[56] References Cited

U.S. PATENT DOCUMENTS

| | | | |
|---|---|---|---|
| 3,808,782 | 5/1974 | McWilliams | 56/16.9 |
| 3,908,914 | 9/1975 | Cushman | 241/101.7 |
| 4,057,952 | 11/1977 | Brokaw | 56/16.9 |
| 4,150,796 | 4/1979 | Kudo | 241/101.1 |
| 4,169,561 | 10/1979 | Saxton | 241/101.1 |
| 4,263,771 | 5/1981 | Iaboui et al. | 56/16.9 |
| 4,307,844 | 12/1981 | Caron | 241/101.1 |
| 4,446,679 | 5/1984 | Thomas | 56/16.9 |
| 4,478,030 | 10/1984 | Druais et al. | 56/60 |

FOREIGN PATENT DOCUMENTS 519237 11/1981 Australia .
3404733 10/1985 Fed. Rep. of Germany .
2928957 2/1981 France ................................. 56/16.9

OTHER PUBLICATIONS

Popular Science, 10–1978, "Make a Mulcher For Your Mower", p. 178.

Primary Examiner—John Weiss
Attorney, Agent, or Firm—McDermott, Will & Emery

[57] ABSTRACT

A mulching attachment for a rotary lawn-mower has a baseplate on which the mower can be mounted. A feed hopper is in communication with the cutting region of the mower via a feed passage opening to the upper face of the baseplate. Vegetable matter is fed into the feed hopper through a feed inlet, passes through the feed passage into the cutting region, is comminuted there by the mower blades, and is discharged as mulch into the grass-catcher of the mower.

2 Claims, 4 Drawing Sheets

MULCHER

TECHNICAL FIELD

THIS INVENTION relates to mulching devices and more particularly to a mulching adaption, or adjunct, or attachment, to a conventional rotary motor lawn-mower.

BACKGROUND ART

Devices for producing a useful horticulture mulch from vegetable matter are known, and, in this regard, attention is drawn to the specifications relating to Australian Patent Applications Nos. 28,344/77 (now Australian Patent No. 513,253); 33,134/78; and 25,297/84.

A typical such device has a cutting circle of perhaps 100 mm to 150 mm diameter, the blades usually being driven by, say, a single-phase electric motor of about 1.5 H.P. These prior art mulchers are quite expensive machines but they nevertheless suffer from having a relatively low peripheral velocity, due to the small dimensions of their cutting blades; moreover, these, as well as numerous other mulching devices, frequently become clogged with leaves or cuttings, particularly when these are wet. According to one aspect of this invention there is provided a mulching arrangement for a rotary motor lawn-mower, said attachment comprising a base plate upon an upper surface of which a rotary motor lawn-mower is removably mountable; and including a feed hopper attached thereto and being adapted to receive vegetable matter to be converted into mulch; said feed hopper being in communication with said upper surface of the base plate via a feed passage which is so formed and mounted relative to said base plate, that on operation of said lawn-mower a vibrating moment is imparted from the mower and base plate to said feed passage, such as to minimize or avoid clogging and blocking thereof by vegetable matter passing therethrough; the arrangement being such that vegetable matter fed into said hopper through at least one said inlet therein, passes through said feed passage to enter a cutting region of said mower, to be thereafter comminuted into mulch and discharged through an existing discharge chute of said mower.

BRIEF DESCRIPTION OF THE DRAWINGS

In order that the reader may gain a better understanding of the present invention, hereinafter will be described some preferred embodiments thereof, by way of example only and with reference to the accompanying drawings in which.

DESCRIPTION OF THE PREFERRED EMBODIMENTS

Figure 1:
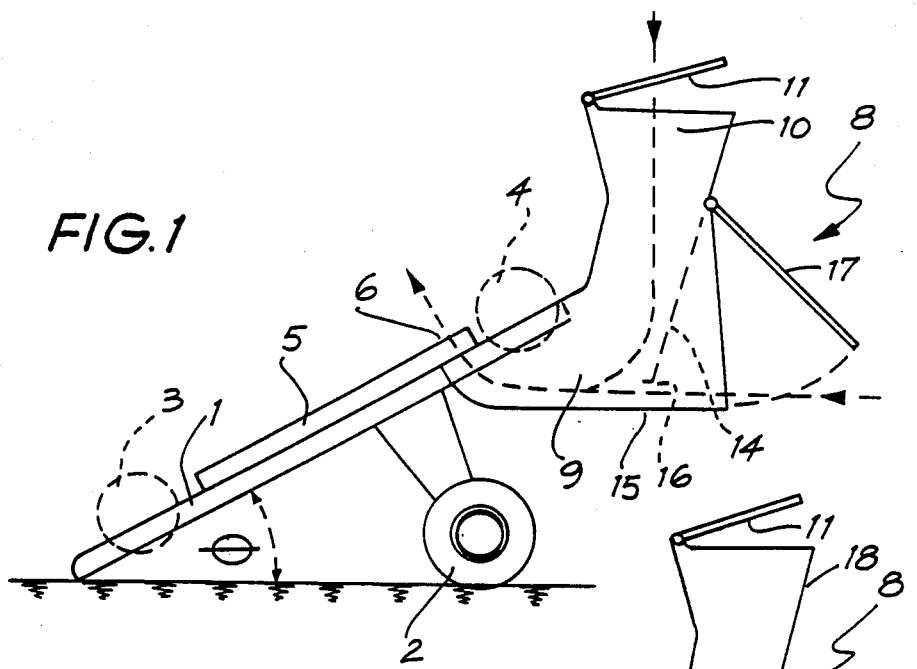
FIG. 1 is a somewhat schematic side elevation of the inventive mulching attachment.

In a first embodiment of the inventive mulching attachment there is a baseplate 1 having a pair of ground-engaging wheels, as 2. Upon the upper surface of baseplate 1 is removably mountable a conventional rotary motor lawn-mower, the mower not being shown in the drawings but the notional position of its wheels being indicated in chain-line at 3, 4. The skirt of the mower fits snugly within a raised part-circular land 5 and covers the mouth 6 of a feed passage; a gap 7 in land 5 permits comminuted material to be discharged into the grass-catcher of the mower in the usual way. The mower is attached to the upper surface of baseplate 1 by means of such as over-centre clamps, toggle clamps or the like; to form a seal between the mower skirt and baseplate, there may be provided an elastomeric, annular gasket within land 5.

When the attachment is in use, baseplate 1 rests at an angle $\theta$ to the ground, angle $\theta$ being from, say, 5° to perhaps 30°. Baseplate 1 may be made of wood, particle board, metal, or a suitable plastic material.

Associated with baseplate 1 is a feed hopper, generally of a plastic molding but which may nevertheless be of metal. Feed hopper 8 is in communication with the baseplate's upper face via a feed passage 9 and the previously-mentioned mouth 6. A primary feed inlet 10 of hopper 8 may have a hinged cover 11, thus vegetable matter to be mulched is able to be fed into hopper 8 through feed inlet 10 and passed through feed passage 9 for discharge into the cutting region of the mower via feed passage mouth 6.

Figure 4:
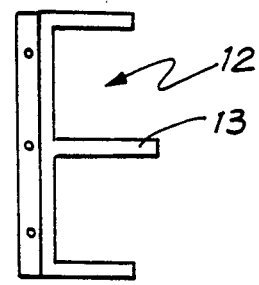
FIG. 4 shows an alternative cutter bar.

Since feed hopper 8 is ideally made of plastic, the feed passage mouth 6 may well be bounded by a metal cutter bar 12 which is easily replaceable when it becomes worn by repeated contact with the material being comminuted by the shearing action of the mower blades against cutter bar 12. As is to be seen in FIG. 4, such a cutter bar 12 may have an additional centre bar 13 to assist fine comminution of the vegetable matter, or perhaps a plurality of additional bars for the same purpose.

Figure 2:
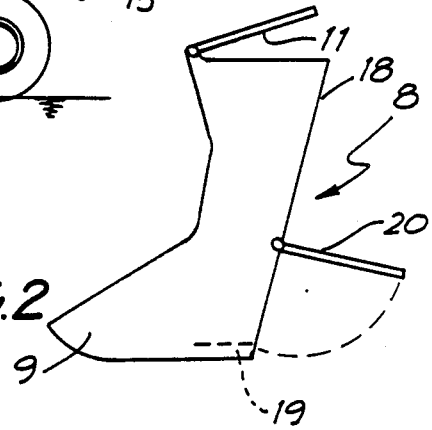
FIG. 2 illustrates a minor variation.
Figure 3:
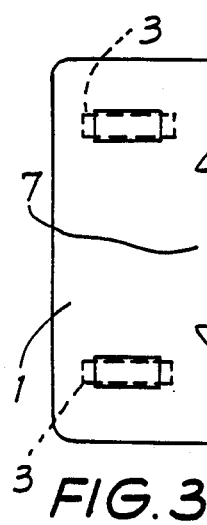
FIG. 3 is a plan view corresponding to the side elevation of FIG. 1.

Feed hopper 8 may be provided with an internal baffle 14 which stops just short of the base 15 of the hopper 8 to thus leave a secondary, front-opening feed inlet—the slit 16—through which such vegetable matter as cuttings and twigs, etc. may be fed for mulching. This secondary feed inlet slit 16 may be closed off by a hinged cover 17. While internal baffle 14 serves to guide, or channel, fed vegetable matter to the cutting region, the feed hopper may be constructed with a similarly-sloped front panel 18, as is to be seen in FIG. 2, in which case the secondary feed inlet is located as indicated at 19 and is closed off by a hinged cover 20.

Figure 5:
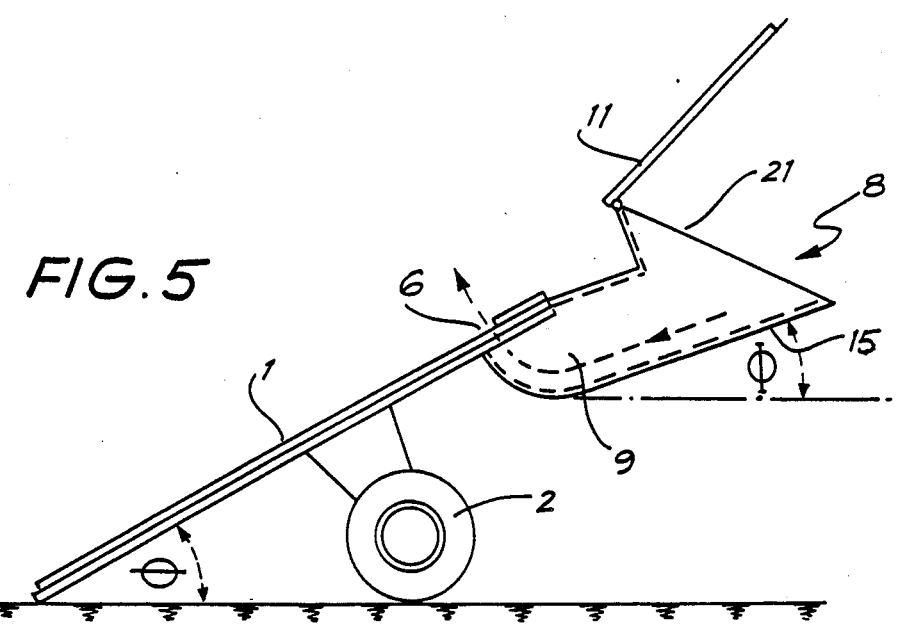
FIG. 5 is a side elevation of a second preferred embodiment.
Figure 6:
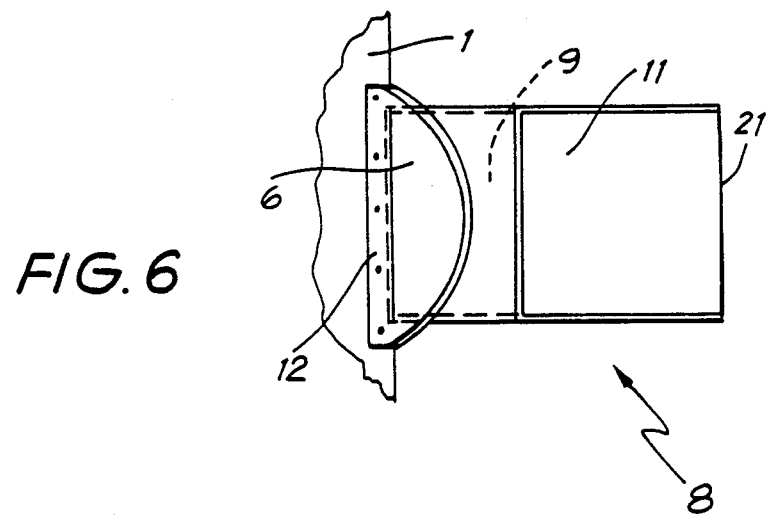
FIG. 6 is a fragmentary corresponding plan view.
Figure 7:
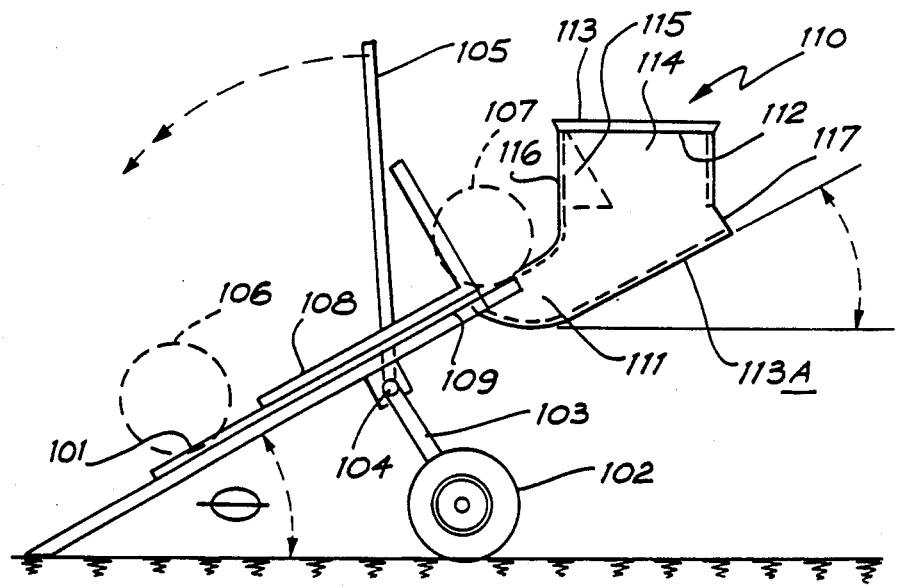
FIG. 7 is a side elevation of a third preferred embodiment.
Figure 10:
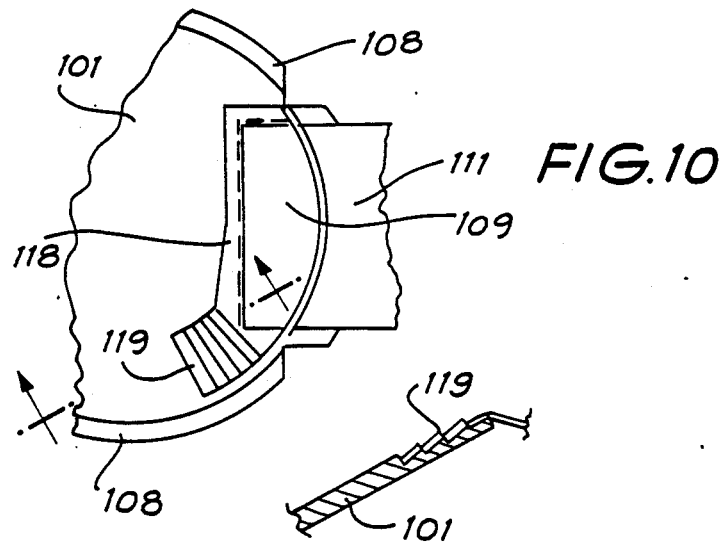
FIG. 10 is a fragmentary plan view showing the cutter bar arrangement in greater detail.
Figure 8:
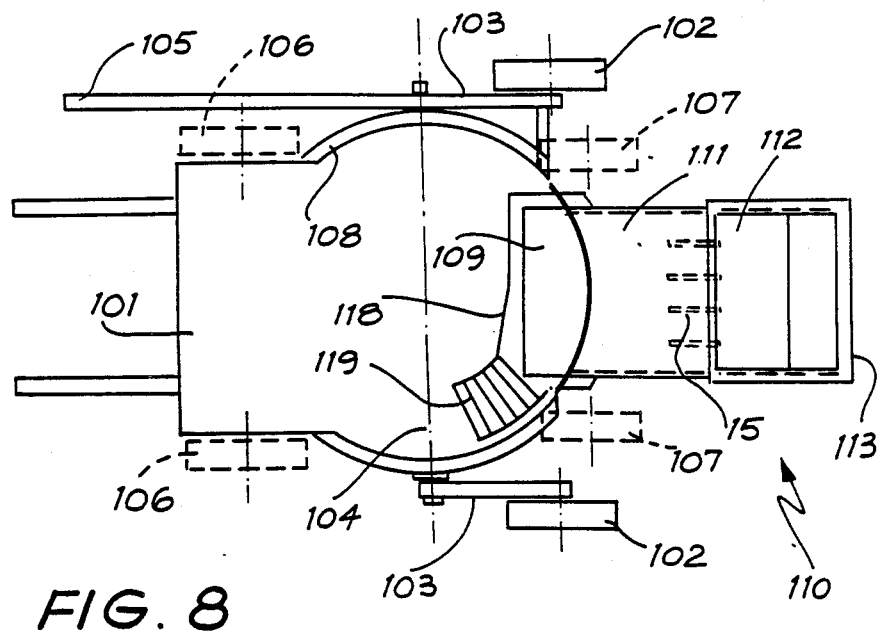
FIG. 8 is a corresponding plan view.
Figure 9:
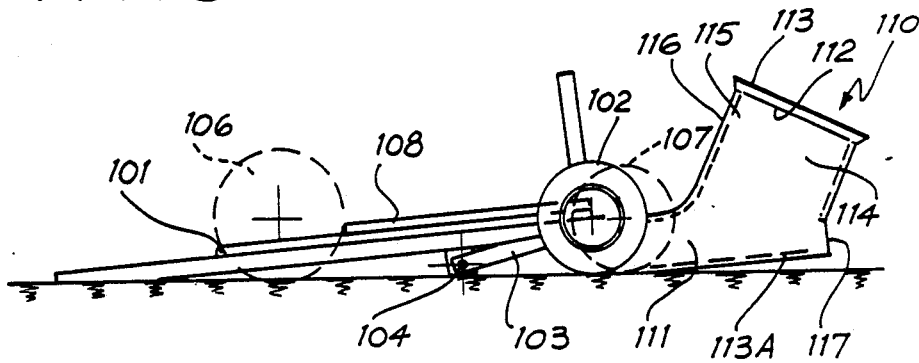
FIG. 9 shows the attachment in a "collapsed" position for the convenient mounting of a lawn-mower therein.

A comparatively simply-constructed, yet highly preferred, embodiment is shown in FIGS. 5 and 6 of the drawings.

In this embodiment, all material to be comminuted into mulch is fed through a single opening 21 of a simplified hopper 8. The optimum angle $\phi$ for the base of the hopper with respect to the ground is perhaps 15°, which promotes movement of material into the feed passage 9 where suction then conveys it into the cutting region of feed passage mouth 6. Opening 21 of simplified hopper 8 may well optionally be provided with a hinged cover or lid 11. Long cutting, grass-stems, twigs, etc. are simply placed on the base 15 of feed hopper 8 and fed manually into food passage 9 for auction into the cutting region at mouth 6.

In the preferred embodiment illustrated in FIGS. 7 to 10 of the drawings, the inventive mulching attachment again comprises a baseplate, referenced 101, which is provided with ground-engaging wheels 102. These wheels 102 are located at the ends of a pair of swingable arms 103 pivotable about a common shaft 104. The angular disposition of swingable arms 103, and hence the position of the ground-engaging wheels 102 relative to baseplate 101, may be varied so as to permit baseplate 101 to be initially disposed horizontally, or at least at only a small angle to the ground, as is to be seen in FIG. 9. In this way a heavy mower may be wheeled into position above baseplate 101 and subsequently dropped onto it by operation of the lawn-mowers own height adjustment mechanism. When the mower is correctly positioned on base plate 101, and held thereon by means of such as bolts, over-centre clamps, toggle clamps and the like, baseplate 101 together with the superposed lawn-mower is raised by operation of a lever 105 and locked into the final operating position against butment strut 105A at an angle selected to suit the particular make of lawn-mower.

The lawn-mower per se is not shown in the drawings but its wheels are indicated in chain-line at 106 and 107. The skirt of the mower fits snugly within the raised, partcircular land 108 and covers mouth 109 of a feed passage; to form a seal between the mower skirt and the baseplate 101, there may be provided an elastomeric, annular gasket within land 108. Baseplate 101 may be fabricated from, say, wood, particle board, metal, or suitable plastic material.

As before, associated with baseplate 101 is a feed hopper, generally referenced 110, ideally a plastic molding but which nevertheless could be of a metal. Feed hopper 110 is in communication with the upper face of baseplate 101 via a feed passage 111 and the said mouth 109. A primary feed inlet 112 of hopper 110 may have a hinged cover or lid 113 so that vegetable matter to be comminuted into mulch may be fed into hopper 110 through feed inlet 112 and which passes through feed passage 111 for discharge into the cutting region of the mower via feed passage mouth 109.

In tests leading up to the present invention, it became evident that the greater the angle θ between base 113A of hopper 110 and the ground, the better are the feed characteristics of the device; for example, leaves and the like have less tendency to bunch and so obstruct the feed passage, and a faster transfer of material to mouth 109 is attainable. Therefore, the optimum angle θ should be approximately the same as the angle of elevation of baseplate 101 with respect the horizontal; that is to say, baseplate 101 and feed hopper base 113A are parallel, or at least nearly so. The operating angle θ, and hence the angle hopper base 113A makes with the ground, may well vary but in practice it has been found that an angle θ of about 15° will give a lower feed rate and a concomitant increase in mulching efficiency, due to the fact that less vegetable matter is in contact with the mower blades at any one time. Nonetheless, an angle θ of perhaps 30° will give a considerably faster feed rate and, if required or desired, the material may be passed through the cutting region more than once to thus provide a finer mulch.

Feed hopper 110 has a short "neck" 114 provided with a number of baffles, plates, or fins 15 projecting from its mower-facing wall 116; these are so dimensioned as to prevent entry of an operator's fingers into the cutting region.

In order to provide for the shredding and mulching of elongated vegetable material such as cuttings, twigs, vines, and the like not readily feedable to the cutting region through the primary feed inlet 112, there is a full-width secondary feed inlet 117 in the outwardly-facing wall of hopper 110. The lower edge of this secondary feed inlet 117 is contiguous with hopper base 113A, and its height, while being sufficient to permit entry of vegetable matter to be comminuted, is still not great enough to allow an operator's hand to intrude into the cutting region.

Feed hopper 110 being preferably made of a plastic material, the mouth feed passage 109 may very well be bounded by a primary cutter bar 118 advantageously placed along that part of the perimeter of mouth 109 where comminution mainly occurs. However, the mulching action of the mower blades may be enhanced by the provision of ancillary "ganged" cutter bars 119, disposed radially with respect to the drive shaft of the lawn-mower for preference, but which could equally well be at whatever angle provides the best shearing action. All the cutter bars may have hardened edges to prolong their cutting lives, or they may alternatively be made from any one of a number of cast, forged or fabricated metals, or from other suitable materials.

To operate the mulching attachment of the present invention, the rotary mower is placed upon the baseplate and secured thereto by the clamping devices so that the mower's shirt is substantially sealed to the baseplate except at the discharge gap. The mower motor is started and vegetable matter to be mulched is fed to the blades through either of the feed inlets. Where the material to be mulched is of small dimension, it may be fed into the primary feed inlet, the secondary feed inlet being closed. On the other hand, where the material is in the form of twigs, cuttings, and like elongated matter, it may be fed into the secondary feed inlet. Even "tough" material such as eucalypt leaves, bark, conifer "cones", and large twigs and canes is able to be converted into mulch by the inventive device. The selection of the appropriate feed inlet is, of course, at the discretion of the operator.

In the present invention, the feed passages 9 and 111 are formed of resilient material such as for example, plastic and are attached or secured to the base plate, in such a manner that when a mower is mounted on the base plate, and duly actuated, the vibratory moment generated by operation of the mower will be imparted to the feed passages 9 and 11 which will therefore vibrate. It has been found that the imparting of this vibratory moment, as a result of the mounting of the feed passages 9 and 111, relative to the base plate, causes the feed passages to vibrate, the vibration substantially diminishing and in some cases avoiding the change of vegetable matter becoming clogged in the feed passage during the passage of vegetable matter therethrough. As will be appreciated, wet vegetable matter has a tendency to become clogged and the vibration of the feed passage 9, 111, by virtue of its mounting relative to the base plate, and the imparting of vibration from the mower to the feed passage, will substantially inhibit or diminish such clogging. It has also been found that the vibratory moment imparted to the feed passage 9, 111, assists in actual passage of vegetable matter through the feed passage to the base plate.

The inventive mulching attachment is easily portable and light in weight, especially when its construction is of plastic. Moreover, it can be taken to the site of material to be mulched, being independent of electrical power outlets. The efficiency and effectiveness of the present invention is high due to several advantageous factors, for instance, an average I/C-engined rotary mower makes about 3.5 H.P. available for mulching as against the 1.5 H.P. of the electric motor of a conventional mulcher. There again the peripheral velocity of the mower blades is approximately three times that of conventional mulchers for the same R.P.M. figure - that is to say, an average rotary mower has a cutting circle of about 450 mm diameter compared to perhaps a 150 mm diameter cutting circle of the conventional mulcher. The inventive mulching attachment is largely self-cleaning and not prone to become clogged with green, and often wet, vegetable matter.

From the abovegoing it will be readily appreciated by those skilled in the art that numerous variations and modifications may be made to the invention without departing from the spirit and scope thereof, all as set out in the following claims.

I claim:

1. A mulching attachment for a rotary motor lawnmower, said attachment comprising a base plate upon an upper surface of which a rotary motor lawnmower is removably mountable; and including a feed hopper attached thereto and being adapted to receive vegetable matter to be converted into mulch; said feed hopper being in communication with said upper surface of the base plate via a feed passage which is so formed and mounted relative to said base plate that on operation of said lawnmower a vibratory moment is imparted from the mower and the base plate to said feed passage, such as to minimize or avoid clogging and blocking thereof by vegetable matter passing therethrough; the arrangement being such that vegetable matter fed into said hopper through at least one feed inlet therein, passes through said feed passage to enter a cutting region of said mower, to be thereafter comminuted into mulch and discharged through existing discharge chute means of said mower; wherein a pair of laterally spaced apart swingable arms are pivotally mounted to said base plate, one on each side thereof and both extending downwardly below an underside of said base plate; wheels being mounted at lower ends of said arms; lever means being connected to or formed with at least one of said arms; said lever means being operable to move said arms and wheels into juxtaposition with the underside of said base plate, in which position said base plate is on or adjacent a ground surface; such as to allow for the placement and/or removal of a motor lawnmower thereon said lever means being further operable to move said base plate into a position in which it is supported substantially above the ground at a predetermined or desired angle relative thereto, by said arms and wheels; means being provided to releasably locate said lever means and base plate in such a position in which said base plate is located substantially above and angled relative to the ground.

2. A mulching attachment for a rotary motor lawnmower, said attachment comprising a base plate upon an upper surface of which a rotary motor lawnmower is removable mounted; and including a feed hopper attached thereto and being adapted to receive vegetable matter to be converted into mulch; said feed hopper being in communication with said upper surface of the base plate via a feed passage; said feed passage being mounted and attached to said base plate that on operation of said lawnmower a vibratory moment therefrom is imparted to said feed passage, such as to cause said feed passage to vibrate to minimize or avoid clogging and blocking thereof by vegetable matter passing therethrough; the arrangement being such that vegetable matter fed into said hopper through at least one feed inlet therein passes through said feed passage to enter a cutting region of said mower, to be thereafter comminuted into mulch and discharged through an existing discharge chute of said mower; a pair of laterally spaced apart swingable arms being pivotally mounted below said base plate, one on each side thereof and both extending downwardly below an underside of said base plate; an elongate transverse axle shaft extending between upper ends thereof and being mounted below said base plate; wheels being mounted at lower ends of said arms; lever means being connected to at least one of said arms; the arrangement being such that movement of said lever means to a first position moves said arms and said wheels into a position in juxtaposition with the underside of said base plate and in which said base plate is in juxtaposition with a ground surface, such as to allow for location and removal of a mower; movement of said lever to a further position moving said base plate to a position in which it is substantially above said ground surface at a predetermined or desired angle relative thereto; and means being provided to releasably locate said lever and base plate in said position substantially above and angled relative to the ground surface.

* * * * *